Oct. 5, 1943.  O. W. JOHNSON  2,330,977
COMBINED IRONING AND FOLDING MACHINE
Original Filed Dec. 21, 1938  8 Sheets-Sheet 1

INVENTOR
OSCAR W. JOHNSON
BY *Hyde and Meyer*
ATTORNEYS

Oct. 5, 1943.   O. W. JOHNSON   2,330,977
COMBINED IRONING AND FOLDING MACHINE
Original Filed Dec. 21, 1938   8 Sheets-Sheet 5

INVENTOR
OSCAR W. JOHNSON
BY Hyde and Meyer
ATTORNEYS

Oct. 5, 1943.  O. W. JOHNSON  2,330,977
COMBINED IRONING AND FOLDING MACHINE
Original Filed Dec. 21, 1938  8 Sheets-Sheet 7

INVENTOR
OSCAR W. JOHNSON
BY Hyde and Meyer
ATTORNEYS

Patented Oct. 5, 1943

2,330,977

UNITED STATES PATENT OFFICE 2,330,977

COMBINED IRONING AND FOLDING MACHINE

Oscar W. Johnson, Rochester, N. Y., assignor to The American Laundry Machinery Company, Norwood, Ohio, a corporation of Ohio Original application December 21, 1938, Serial No. 246,928. Divided and this application May 3, 1940, Serial No. 333,071

4 Claims. (Cl. 38—2)

This invention relates to combined ironing and folding machines such as are used for ironing and folding flatwork in laundries, particularly sheets, table cloths, spreads and the like.

This application is a division of my copending application Serial No. 246,928, filed December 21, 1938, which became Letters Patent No. 2,275,964, granted March 10, 1942.

One of the objects of the present invention is to provide a novel combination between a folding machine and an ironing machine whereby flexible endless members used for conveying work through the ironer actuate the devices of the folding machine so as to provide exact synchronism between the operations of the two machines.

Another object of the present invention is to provide in a combination of a folding machine with an ironing machine flexible endless devices for carrying workpieces through the ironing machine and flexible endless devices for carrying material through the folding machine, said endless devices having portions lying in overlapping relation and travelling along the same path.

Another object of the present invention is to provide overlapping flexible endless devices, some of which are connected with an ironing machine and others with a folding machine, and a measuring device operated by the overlapping portions of the endless devices for measuring the workpiece preparatory to setting the folding machine to produce predetermined folds in the workpiece.

Another object of the present invention is to provide in a combination between an ironing machine and a folding machine wherein flexible endless devices are used for conveying the workpiece through each machine, folding devices driven by the flexible endless devices of the ironing machine.

A further object is to provide coacting flexible endless work carriers, some connected with the ironing machine and others connected with the folding machine, a measuring device for the workpiece cooperating with the flexible endless carriers, and mounting means for the measuring device arranged so as not to interfere with the operation and adjustment of the ironing machine endless carriers in the usual manner.

Other objects and advantages of the present invention will appear from the accompanying description and drawings and the essential features thereof will be summarized in the claims.

In the drawings.

Fig. 13 is a detail fragmental side elevation, showing a portion of each of the flatwork ironer and the folding machine, and the connecting means therebetween, as well as the support for the measuring apparatus;

Fig. 14 is an enlarged side elevation of the measuring apparatus shown in Fig. 13;

Fig. 15 is an enlarged detail view, showing one of a pair of duplicate devices for initiating operation of the timer mechanisms;

Fig. 16 is a view of the mechanism shown in

Fig. 15 as viewed on the line 16—16 looking in the direction of the arrows;

The machine illustrated in the drawings is what may be called a two lane machine in that it has duplicate mechanisms arranged in order along its left and right halves, forming two lanes along which two separate and distinct streams of flat articles to be folded may travel for separate folding, the mechanisms on the right lane being controlled by the articles travelling therein and those on the left lane by articles travelling therein. Because the mechanisms are duplicate, description of one will suffice for both, but to distinguish them in the drawings the parts in the left lane will be designated by numerals followed by the suffix *a* and those in the right lane by numerals followed by the suffix *b*, wherever that is necessary or desirable.

Figure 9:
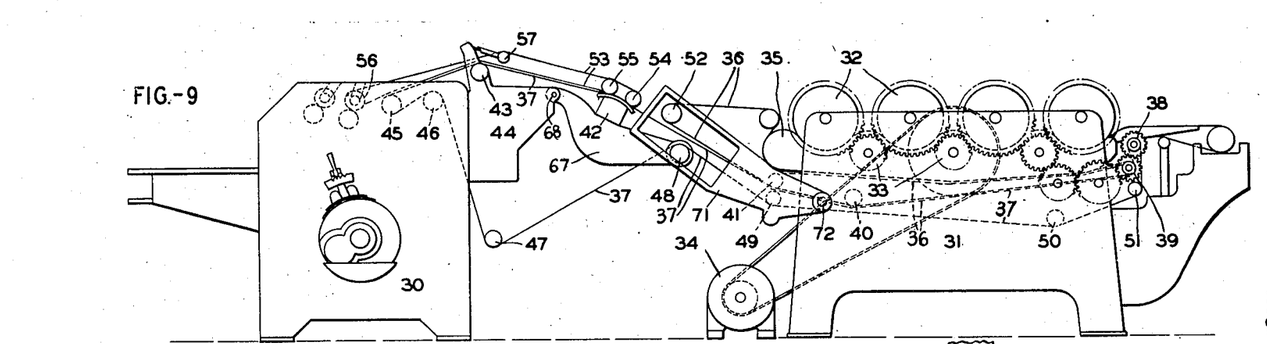
Fig. 9 is a diagrammatic side elevation illustrating both the folding machine and the flatwork ironer with which it is associated, the diagram showing the arrangement and path of travel of the conveying and driving ribbons.
Figures 10, 11:
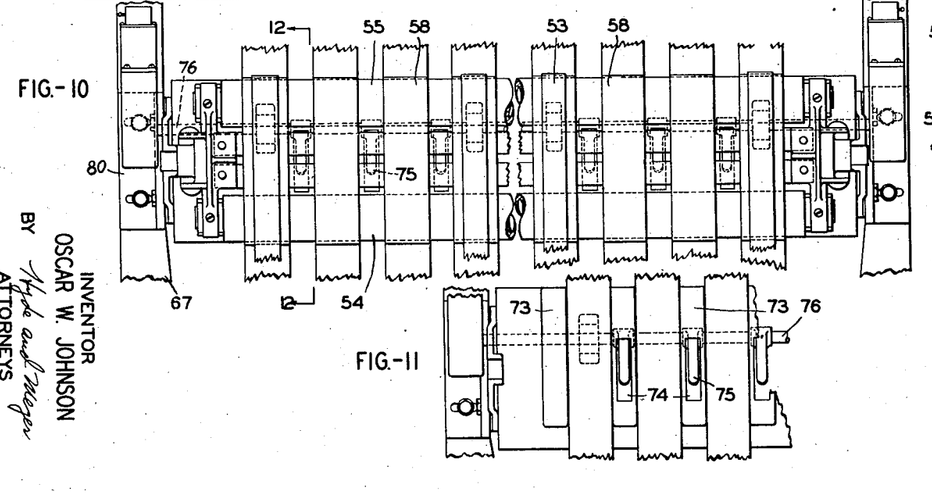
Fig. 10 is a detail plan view of the measuring apparatus shown in Figs. 13 and 14.
Fig. 11 is a detail fragmental plan view of the measuring apparatus, with the floating ribbon supporting structure or pressure device omitted.

The folding machine is here shown in combination with a flatwork ironer of a known type, so that the flat articles ironed in the ironing machine are delivered automatically to the folding machine to be folded thereby. Fig. 9 illustrates a folding machine marked generally 30, made and operated according to the present invention and associated with a flatwork ironer of standard type marked generally 31. Said flatwork ironer may be of any suitable type, but as shown includes a plurality of padded ironing rolls 32 interconnected by gears generally represented at 33 operated from a belt drive by the driving motor 34. The rolls cooperate with a hollow heated chest 35. Articles are fed into the ironing machine at the right-hand end of Fig. 9, passing to the left between the rolls and chest 35 thereof, and around the end of the chest and back to the right along its under surface between the chest and the upper stretch of endless apron 36 which carries them back to the feeding end of the ironer whence they are returned to the delivery end of the ironer to the left between the lower stretch of apron 36 and the upper stretch of endless conveying ribbons 37. Said ribbons travel over rolls 38 and 39 at the feeding end of the ironer, under rolls 40 and 41, through the measuring device generally indicated at 42, over a roll 43 supported by brackets 44 on the folding machine, around and under a roll 45 of the folding machine, over a roll 46 thereof, beneath a roll 47 thereof, over a roll 48 and beneath rolls 49, 50 and 51. As the articles to be folded, lying between the upper stretch of the ribbons 37 and the lower stretch of the endless apron 36, pass beyond the last apron supporting roll 52 of the ironing machine and into the measuring device 42, they travel beneath endless tapes or ribbons 53 of the folding machine. These ribbons 53 travel around rolls 54 and 55 of the measuring device, over the roll 43, around roll 56 and over a tension roll 57. Short endless tapes 58 (Fig. 10) also travel around the rolls 54, 55.

Figure 1:
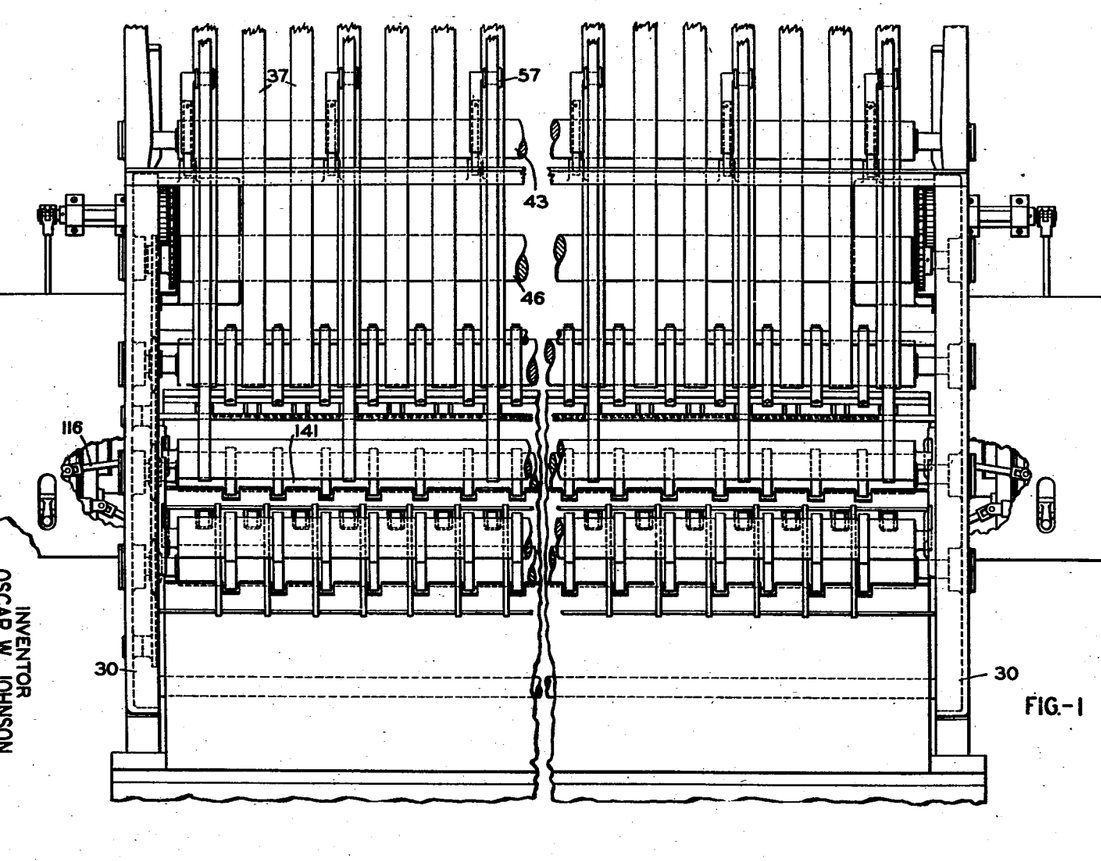
Fig. 1 is a plan view of a folding machine embodying the invention, parts being broken out to expose underlying parts, the central portion of the mechanism being omitted.
Figures 2, 3, 4:
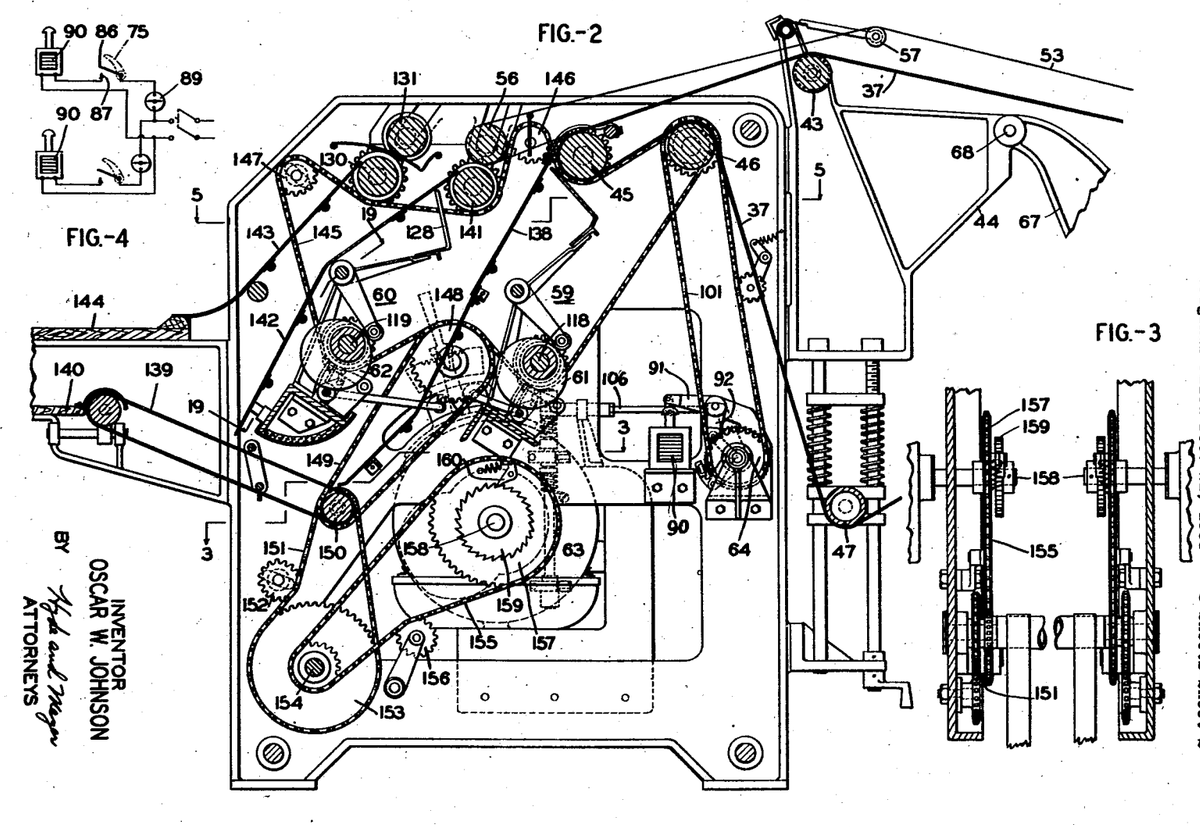
Fig. 2 is a sectional elevation of the machine as viewed from the right in Fig. 1, the section being taken on the line 2—2, Fig. 5.
Fig. 3 is a detail sectional plan view on approximately the line 3—3, Fig. 2, the central portion of the machine in this view being broken away, with the sides brought together to illustrate more clearly a portion of the drive mechanism.
Fig. 4 is a wiring diagram illustrating a control circuit for the solenoids for controlling the timing mechanism.

As best seen in Fig. 2, the folding machine comprises a first or primary folding device marked generally 59 (Figs. 2 and 22), a second folding device 60, operating mechanisms for the two folding devices marked generally and respectively 61 and 62, a timing mechanism marked generally 63, for controlling operation of the folding mechanisms, and a mechanism generally indicated at 64, sensitive to the operation of the measuring device 42, and adapted to control the timing mechanism to cause it to produce folds of the article in proportion to its length, whatever may be its absolute length. Duplicate mechanisms are provided, as stated, for the two lanes of the machine, all mechanisms in one lane being independent of those in the other lane, except as hereinafter noted, so that descriptions of the mechanisms of one lane will suffice for both. The various mechanisms will be described in the order of progress of the work through the machine.

Measuring apparatus

The measuring apparatus (of which there are two, one for each lane) is best illustrated in Figs. 9 to 14, inclusive. It comprises a housing 65, Fig. 12, generally triangularly shaped in cross section, the upper face 66 of which is curved or arcuate in form where the lower tapes 37 coming from the ironing machine and supporting the article pass along it beneath the tapes 53 of the folding machine. This housing extends the full width of the machine and is supported at one end upon brackets secured to arms 67 pivoted at 68 to the brackets 44 of the folding machine. These arms at their opposite ends carry rollers 69 working in slots 70 in the adjustable apron carrying brackets 71 of the ironing machine. The brackets 71 are pivotally mounted at 72 on the ironing machine frame to permit raising and lowering movement. When these apron tensioning brackets of the ironing machine are lowered to release apron tension, as is customary in flatwork ironer operation during a rest period or at the end of a day's operation, the rollers 69 ride in the slots 70 and the arms 67 turn about the pivotal connections 68. This type of connection permits unrestricted and full movement of the apron tensioning brackets 71 with little effect upon the measuring device 42 such as might separate its floating pressure device (to be described) from the housing 65.

The arcuate surface 66 of housing 65 is supplemented by strips 73 (Figs. 11 and 12) brazed or otherwise secured thereto which provide imposed or raised portions which lie between and guide the several tapes or ribbons 37. In each raised portion 73 (except in the extreme end ones where it is not required) there is located a slot 74 upwardly through which extend fingers 75. The several fingers in each lane are all mounted upon a common shaft 76. Fingers 75, in their normal position, extend through the spaces between adjacent ribbons 37 and therefore cross the path of travel of the articles moving through the machine and held between tapes 37 and 53, so that said articles by their travel through the machine will depress the fingers for the purpose of instigating operation of the timing mechanism in a manner later to be described.

Figure 12:
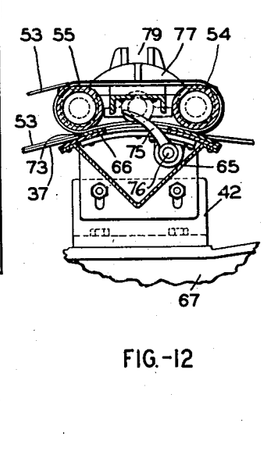
Fig. 12 is a detail sectional elevation on the line 12—12, Fig. 10, looking in the direction of the arrows.

To hold the tapes 53 down upon the tapes 37 and the articles travelling between the two sets of tapes, I provide what may be termed a floating pressure device, including the two rolls 54, 55, Figs. 9 and 12, supported for rotation in a frame 77, having gudgeons 78 at its ends which ride in slots 79 in upwardly extending portions of the brackets which support the housing 65. Ribbons 53 engage the ribbons 37, so that the two sets of ribbons provide holding means which grasp the work between them with floating pressure sufficient to advance the work, to drive rolls 54, 55 and ribbons 53 and to insure that the fingers 75 are depressed by the article passing through the machine. Travel of the gudgeons 78 in the slots 79 takes care of any excess motion required when the ironing machine brackets 71 are lowered during rest periods or at the end of a day.

Each finger carrying shaft 76 operates a controlling switch (Fig. 14) which may be of any suitable form but is shown as of the quick make and break type always biased to open circuit position. Each measuring device at one end is provided with a switch housing 80 into which extends the end of the shaft 76 (see Fig. 10), which within the housing has pinned to it a lever 81, alongside of which, and freely rotatable on the shaft, is a latch member 82.

Lever 81 has a pin 83 working in a notch in the lower end of the latch, the upper end of which latch engages a projection 84 on an arm 85 carrying the yielding switch contact 86 which cooperates with a stationary switch contact 87. A compression spring 88 lies between the arm portions of the levers 81 and 85.

Figures 13, 14, 15, 16:
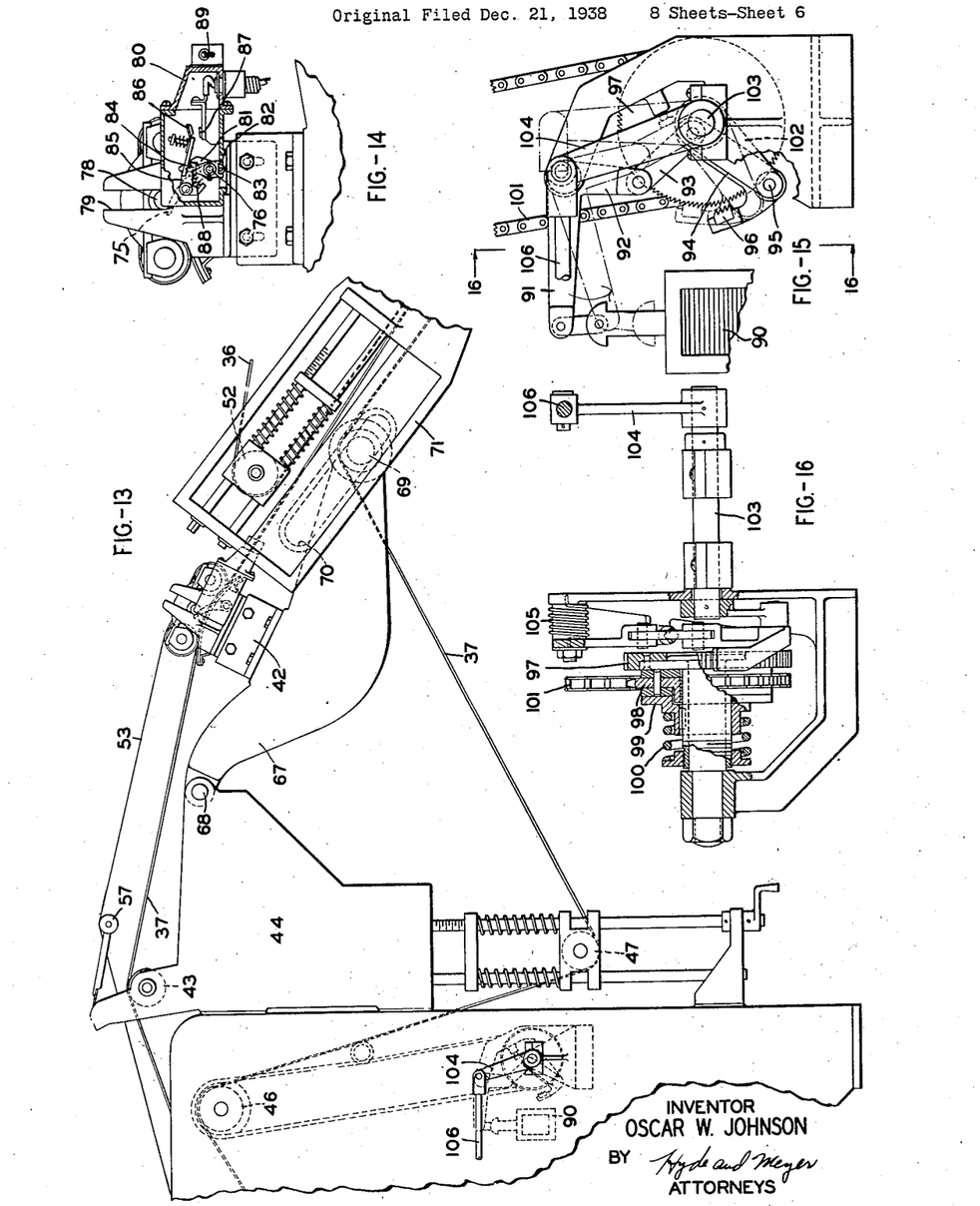

In operation when one or more of the fingers 75 are depressed by an article passing through the machine, the shaft 76 rotates in a counterclockwise direction, Figs. 12 and 14. At first, the upper end of the latch 82, where it lies beneath the lug 84 prevents rotation of the switch contact carrying lever 85, so that the spring 88 is compressed until the pin 83 engages the shoulder at one end of the notch in the latch lever 82. Thereupon said latch lever begins to turn and finally moves out of the way and from beneath the lug 84. Thereupon the stored energy in spring 88 immediately becomes effective and quickly turns lever 85 and brings the contacts 86, 87 together or to closed switch position. This is accomplished without fully expending all energy stored in the spring 88 so that when the fingers 75 are released, spring 88 supplies energy to return the parts to normal position, including return of lever 81 so far that its pin 83 engages the shoulder at the other end of the notch, quickly returning latch 82 to its former position and breaking the connection by suddenly raising the switch arm 85 to open circuit position.

In series with the switch 86, 87, I may include an auxiliary switch in the form of a simple snap switch, marked generally 89, Fig. 14. This switch 89 in Fig. 14 is shown mounted on the switch casing 80, so that it is at one end of the measuring device and consequently between the ironing and folding machines, but obviously switch 89 physically might be located in any suitable position such as at the feeding end of the ironing machine, available for actuation by the feeding operator without moving from her position, as will be readily understood.

*Mechanism for initiating operation of the timer*

Fig. 4 illustrates diagrammatically the electrical control circuit for the two lanes of the machine. It will be noted that each switch 86, 87 is in a circuit in series with an electrically actuated control device, such as the solenoid 90. Since the switches 89 are normally closed and the switch 86, 87 is normally open, it is apparent that the solenoid 90 is deenergized except when the switch 86, 87 is closed by passage of an article through the measuring device 42 with subsequent depression of the fingers 75. Energization of the solenoid 90 actuates the mechanism generally marked 64 for initiating operation of the timer 63. This mechanism is best shown in Figs. 13, 15 and 16, and operates briefly in the following manner.

When solenoid 90 is energized by closing of the appropriate switch 86, 87, bell crank lever 91, 92 is rotated in the counterclockwise direction, Fig. 15. Its arm 92 coacts with link 93 as a toggle, thereby rotating the bell crank lever 94 clockwise about its pivotal shaft mounting 95, and moving the toothed block 96 into engagement with the ratchet wheel 97. This wheel 97 as seen in Fig. 16, is continuously rotated by means of friction drive from sprocket 98 which is yieldingly pressed against wheel 97 by a flange 99 yieldingly pressed by spring 100. The sprocket 98 is driven by chain 101 as will later appear. Since the ratchet wheel 97 continuously rotates, member 96 moves in a clockwise direction, carrying with it lever 102, which is pinned to shaft 103 and therefore rotates said shaft and lever 104 in a clockwise direction, Fig. 15. The timing mechanism as will later appear limits the movement of these parts, a movement which is initiated by the production of engagement between block 96 and ratchet wheel 97, and which is completed by ratchet wheel rotation and after the timer has been started the sprocket 98 continues to rotate but the coupling slips. The parts remain in their new positions until the solenoid 90 is deenergized, when the spring 105 returns the parts to their normal positions shown in full lines, Fig. 15, disengaging the block 96 from the ratchet wheel until renewed energization again establishes said coupling in the same manner before described. If further description of this mechanism is necessary or desirable reference may be had to my above named copending application.

*Timer mechanism*

The timer mechanisms, of which there are two, one for each lane of the machine, are best shown in Figs. 2, 5, 6, 17 and 18. Generally speaking, they are similar in construction and general principle and operation to those shown and described in my prior Patent No. 2,034,040, granted March 17, 1936, excepting that the mechanism is considered simplified, here providing only half and quarter folds, or no fold, whereas the mechanism of the prior patent included an additional selection of one-third and two-third folds, if desired, in addition to which the timer mechanism here is entirely mechanically operated.

The timer initiating mechanism 64, when energized, produces swinging motion of the arm 104, to which is attached a link 106, Fig. 15, also shown in Figs. 2, 5, 6 and 17. When this link 106 is pulled over by operation of arm 104 (moving to the right in Fig. 2 and upwardly in each of Figs. 5 and 6), it operates through a resilient connection pulling outwardly on pins 107 slidably mounted in the timer casing and arranged to produce lateral motion of cam members 108 and 110 to release a pair of arms 109, and simultaneously to establish driving connections for each of these arms in the manner generally described in my prior patent referred to, to move one of them at double the speed of the other. So long as the article is travelling through the measuring device 42 and thereby is holding depressed the fingers 75, the arms 109 are moved along, one at double the speed of the other, so as to eventually space them apart as indicated at X and Y on Fig. 17. But when the rear edge of the article releases the measuring fingers 75, the mechanism 64 releases link 106 so that the timer cams 108 and 110 return to normal position under influence of the stored energy in springs 111. Thereupon the two arms X and Y move together at the same speed as taught in my prior patent. Their relative position has been established by the length of the article so as to produce a double fold thereof, that is, first a half fold and second a quarter fold. The operating finger at the end of arm X eventually engages an operating arm 112, so as to rotate shaft 113, thereby initiating operation of the first folding device 59 to produce the first fold in the article travelling in this lane. The finger at the end of timing arm Y moves in the path of a second operating arm 114 so as to turn shaft 115, thereby initiating operation of the second folding device 60 to produce the second fold of the article, which by that time has reached the proper position for its second fold.

*Folding blade operating mechanism*

Figure 5:
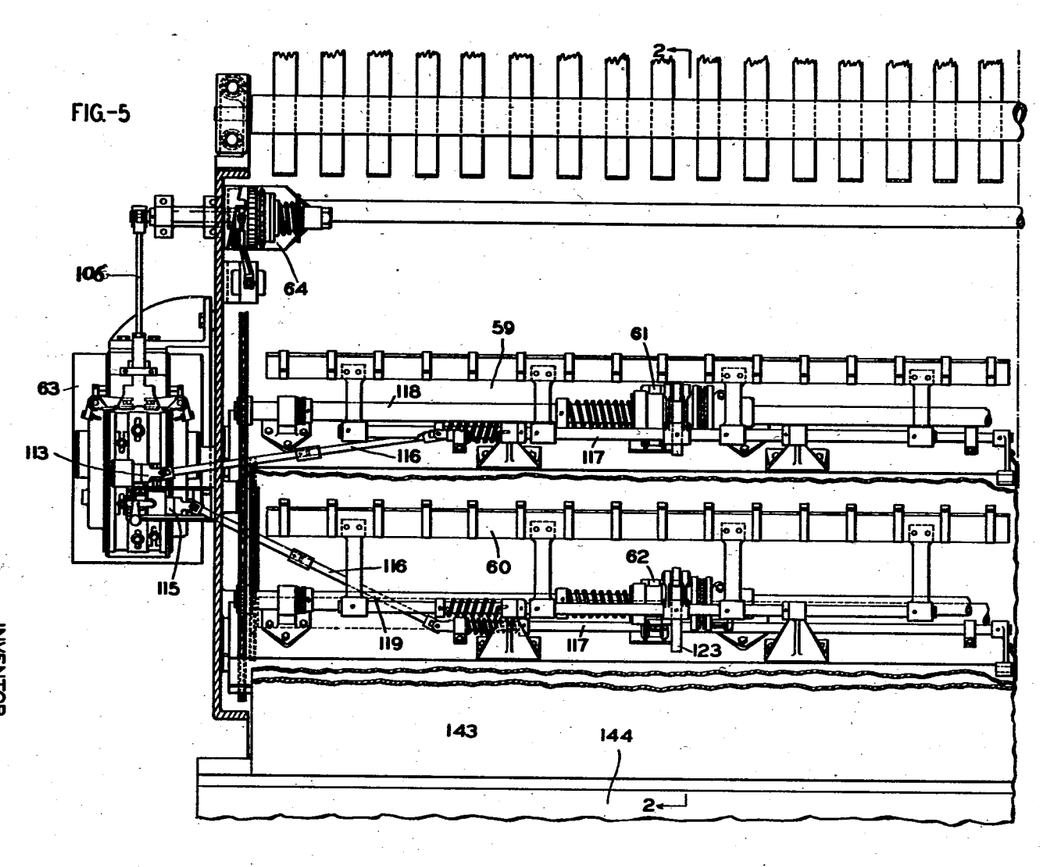
Fig. 5 is a detail sectional view on approximately the line 5—5, Fig. 2, looking in the direction of the arrows, and showing but one half of the machine, to wit, that half of the machine which is to the left when viewed from the position of the receiving operator standing at the bottom of Fig. 1.
Figures 6, 7, 8:
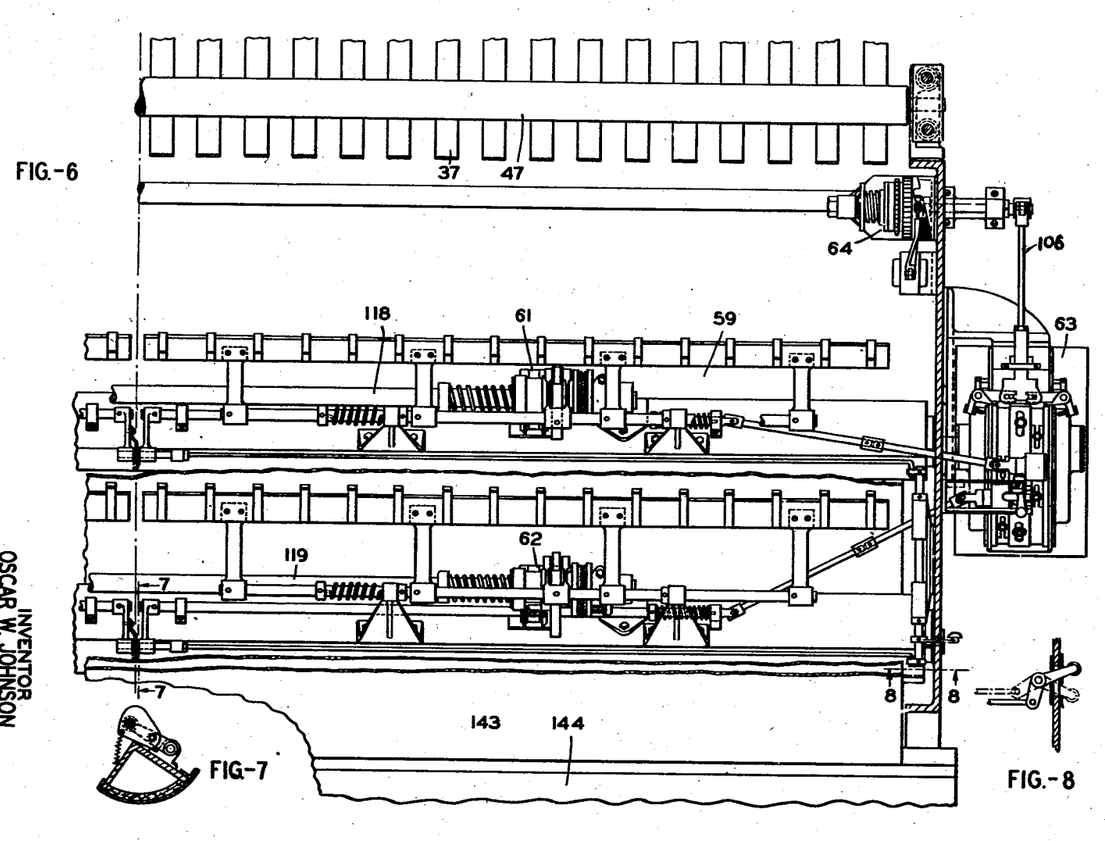
Fig. 6 is a view similar to Fig. 5 and illustrating the corresponding right-hand half of the machine.
Fig. 7 is a detail sectional view on approximately the line 7—7, Fig. 6, looking in the direction of the arrows.
Fig. 8 is a detail sectional view on the line 8—8, Fig. 6, looking in the direction of the arrows.

Since the folding devices 59 and 60 are alike, one only need be described. Referring to Fig. 5, each of the shafts 113, 115 of the timing mechanism 63 is connected by a coupling shaft 116 with a folding blade control shaft 117, Figs. 5, 19 and 20. The mechanism 61 controlled by shaft 117 serves to cause actuation of the folding device 59 by coupling the same with a constantly driven shaft 118, while the mechanism 62 serves to drive the folding device 60 by connecting the same with a constantly rotating drive shaft 119. The mechanism 62 of Figs. 19 and 20 operates as follows.

Figures 17, 18, 19, 20, 21:
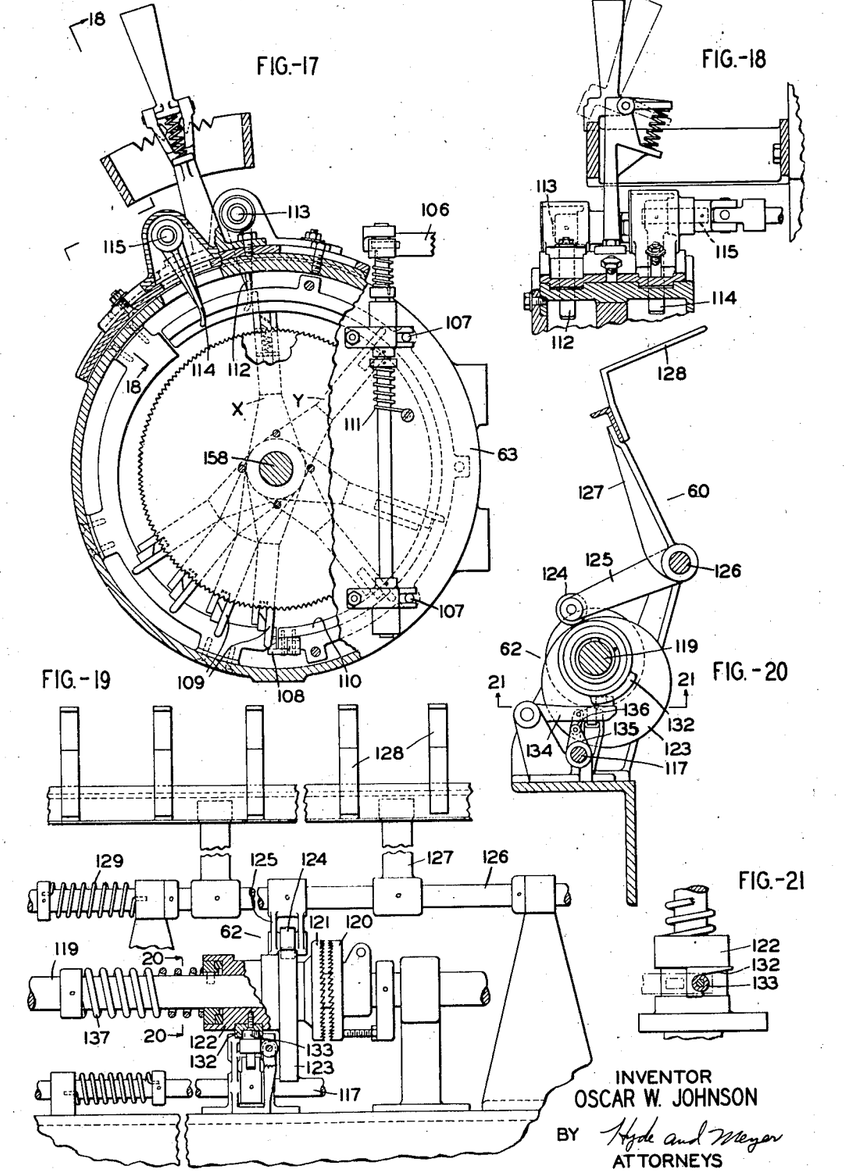
Fig. 17 is a detail side elevation of one of the duplicate timer mechanisms, parts being broken out and in section to expose interior parts.
Fig. 18 is a detail sectional view on the line 18—18, Fig. 17.
Fig. 19 is a detail fragmental view of one of the folding blade operating mechanism, the view being taken substantially on the line 19—19, Fig. 2.
Fig. 20 is a detail sectional view on approximately the line 20—20, Fig. 19, looking in the direction of the arrows.
Fig. 21 is a detail sectional view on the line 21—21, Fig. 20.

Referring to Figs. 19 and 20, shaft 119 has secured thereto one member 120 of a jaw clutch. The other member 121 of the clutch forms part of a sleeve 122 freely rotatable on the shaft and embodying a cam portion 123 adapted to actuate a follower 124 mounted upon an arm 125 pinned to a shaft 126 which in turn is provided with arms 127 for supporting the folding plate 128. Shaft 126 and the folding blade assembly carried thereby are normally biased to the unoperated position shown in Fig. 2 by a coil spring 129. Said spring therefore yieldingly holds the follower 124 against cam 123 so that when the cam is rotated the folding blade oscillates between the unoperated position of Fig. 2 and a position in which it advances an article into engagement between the folding rolls 130 and 131. Sleeve 122 has secured to it a second cam member 132 adapted to actuate a roller 133 on an arm 134 mounted in a suitable bracket. A lever 135 pinned to shaft 117 is connected by a short link 136 to arm 134, so that when the shaft 117 is oscillated by movement of its coupling shaft 116, the arm 134 is rotated clockwise, Fig. 20, withdrawing roller 133 from engagement with the cam member 132. Upon withdrawal, a spring 137 causes sleeve 122 to engage clutch member 121 with the continuously rotating clutch member 120. Since the oscillation of shaft 117 is but momentary, accomplished by movement of the arms X or Y of the timer (see Fig. 17) and their operation of arms 112 and 114, the normal position of the roller 133 is restored before the shaft 119 and cam 123 have made a complete revolution, so that as the cam member 132 returns, the operating face thereof engages roller 133 and cams the sleeve 122 to the left in Fig. 19, disengaging the clutch members 120, 121 and the cam thereupon stops rotating.

An article to be folded enters the folding machine between the tapes 37 and 53 and passes around roll 45. Assuming the article is being folded in one lane only of the folding machine, if no fold is to be made, the switch 89 for the one lane will be in open position and the article will pass down plate 138 to conveyer tapes 139 and so to table 140. If folds are to be made, the same switch 89 controlling the folding mechanism 59 for the lane involved will be closed and when the appropriate timing arm actuates the folding mechanism the blade of folding device 59 will move the article between the pair of folding rolls 56, 141. Then when the once folded article reaches the proper position on plate 142 with respect to the blade 128 of folding device 60, another timer arm actuates the second folding mechanism to carry the article between the folding rolls 130, 131 whence it passes along plate 143 to table 144. Either or both of switches 89 will be closed, depending on whether the width of the article is small enough to enable it to be folded in a single lane or is great enough to require a portion or all of the width of the two lanes combined.

*Driving mechanism*

The rolls 45, 46 are covered with fabric material to provide a frictional coefficient for driving engagement between said rolls and tapes 37, which constitute the sole driving means for the folding machine mechanism. Tapes 37, of course, are driven by the driving rollers in the ironing machine. Consequently all parts of the ironing machine and folding machine turn in accurately timed relation with each other. A drive chain 145 travels over a sprocket on roll 46, under a sprocket on roll 45, over an idle sprocket 146, under a sprocket on each of rolls 141 and 130, over an idle sprocket 147, under a sprocket on shaft 119, over a double sprocket 148, and under a sprocket on shaft 118 back to the sprocket on roll 46. Roller 56 is driven from roller 141 and roller 131 is driven from roller 130. The double sprocket 148 is connected by a chain 149 to a sprocket on roll 150 for driving the ribbon conveyer 139. Each end of the shaft of roll 150 is provided with a sprocket to receive a chain 151 passing around an idler 152 and thence to double sprockets 153 mounted on stub shafts 154, the smaller sprockets of the double sprockets 153 being connected by chains 155 passing around idlers 156 to sprockets 157 which rotate freely on the shafts 158 of the two timer mechanisms. These timer shafts have pinned thereto ratchets 159 (Figs. 2 and 3) cooperating with spring pawls 160 carried by the respective sprocket wheels. This constitutes a pawl and ratchet drive for each of the two timer shafts assuring that they will be driven only in the proper direction and avoiding possible back drive which might cause damage. Upon each end of roll 46 is a sprocket connected by the chain 101 to the sprocket 98 of the respective timer initiating operating mechanisms, and constituting the drive therefor (see Figs. 2, 15 and 16).

If articles are fed through the folding machine which are wider than a single lane, the folding blade mechanisms of the two lanes may be coupled together for operation by one set of timer fingers, the switch 89 of the other timer mechanism being moved to open position. This is accomplished in the present machine by coupling together the shafts 117 respectively of the first or second folding units in the two lanes so that they are all operated or controlled by one timing mechanism.

If further information is necessary or desirable for the construction and operation of the folding machine, reference may be had to my above named copending application.

Modifications

Figs. 22 to 26 show a modified form of machine using fluid pressure, such as compressed air, for operating the various control and operating parts. For the most part the same apron, belt and chain and sprocket drive mechanism is used, such as for the measuring, timing and like mechanisms. The measuring fingers 75, however, operate a valve 161 normally biased closed, to produce connection from a source of supply 162 to the piston and cylinder servomotor 163. This servomotor is connected to the mechanism 64 for initiating operation of the timer in the same manner as the form shown in Fig. 2, so that servomotor 163 in every sense is a substitute for the solenoid 90 of the main form.

Figures 22, 26:
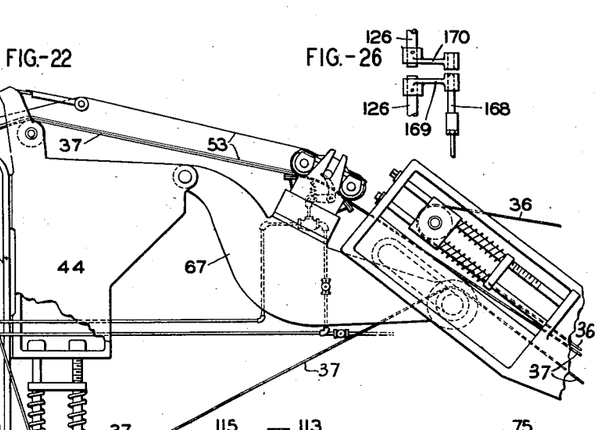
Fig. 22 is a view corresponding to Fig. 2, showing a modified arrangement of control and operating mechanisms utilizing fluid pressure.
Fig. 26 is a detail sectional view on the line 26—26, Fig. 22.

The folding mechanisms 59, 60 are operated directly by servomotors 164 and 165 respectively. These servomotors receive pressure fluid through valves 166 and 167, the stems of which are coupled directly with the arms 113 and 115 respectively, of the timer mechanism. Said valves are biased to normal exhaust position by springs. It will be noted from Fig. 24 that valves 166 and 167 are two-way valves serving in unoperated position to connect servomotors 164 and 165 to exhaust and when operated 90° connecting the servomotors to the source of supply 162. As shown in Fig. 26 the shafts 126 of the folding blades in two lanes may be coupled together for the folding of wide articles by a pin 168 entering suitable bores in the arms 169 and 170.

Figures 23, 25:
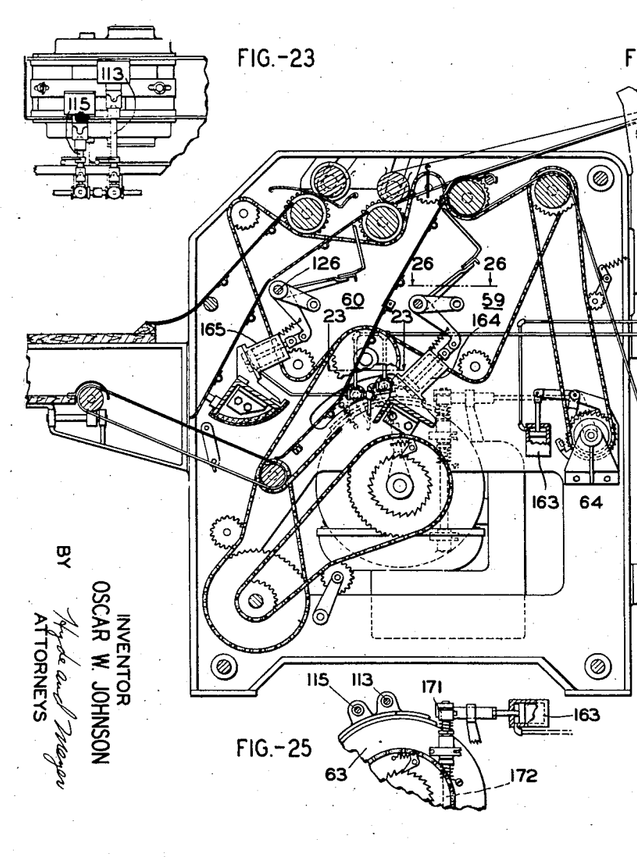
Fig. 23 is a detail plan view of one of the timing devices, showing the coupling means for operation of the valves, the view being taken on approximately the plane of the line 23—23, Fig. 22.
Fig. 25 is a detail view illustrating a further modification of mechanism for initiating operation of the timer.
Figure 24:
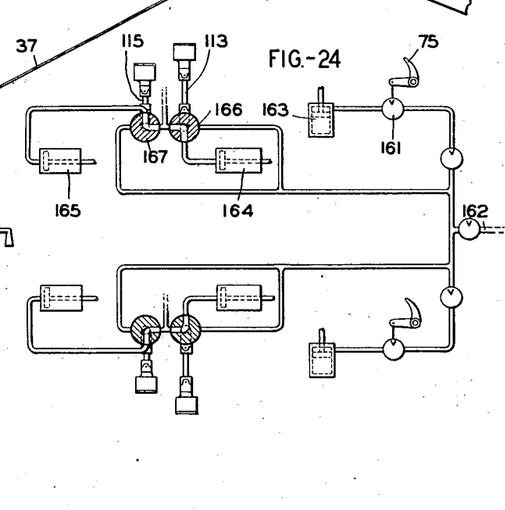
Fig. 24 is a diagrammatic view illustrating the fluid control circuits for the operating mechanism of the machine shown in Fig. 22.

Fig. 25 shows an arrangement in which the piston rod of the servomotor 163, instead of actuating a timer initiating mechanism, is connected directly to arm 171 of the timer mechanism, so as to rotate shaft 172 thereof to control the pins 107 in a manner analogous to the control already described in connection with Figs. 15, 16 and 17. Further description of this modification will be found in my aforesaid copending patent application.

Operation

In describing the operation of the machine as a whole, let us assume first that articles to be folded are of a width adapted to be accommodated by the width of one of the two lanes of the machine. In this case each lane operates as an individual machine controlled by the several articles which successively are introduced into and travel along said lane.

In either lane, as the forward edge of an article reaches the measuring mechanism 42 and depresses the measuring fingers 75, rotating shaft 76, Figs. 12 and 14, the switch mechanism 86, 87 closes, energizing solenoid 90, Fig. 15. Energization of this solenoid sets into operation the timer initiating mechanism shown in Figs. 15 and 16, resulting in pulling over the rod 106 to set into operation the timer mechanism, Fig. 17, causing two of its arms to travel around with differential drive and to set the machine for producing the proper folds, in this case half and quarter folds. When the rear edge of the article reaches fingers 75, the switch 86, 87 opens, de-energizing solenoid 90, and rod 106 returns, and the proper lines of fold have been selected.

When the article which energized solenoid 90 reaches the position on the plate 138 as selected by adjustment of the timer parts, the finger on arm X, Fig. 17, engages finger 112 producing operation of the mechanism for actuating the first folding device 59, causing this folding blade to advance and move the article into contacting position between the folding rolls 56, 141 whereupon the once-folded article passes beyond said rolls to the plate 142 and down along the same.

When the once-folded article reaches the proper position on plate 142, as determined by the setting of the timer parts, the finger on arm Y, Fig. 17, engages finger 114, initiating operation of the second folding mechanism 60, causing its blade 128 to advance and move the once-folded article into contacting position between the folding rolls 130, 131 for the second or double fold, whereupon the double-folded article passes beyond said rolls to plate 143 and slides down along the same to the delivery table 144.

If it is desired that an article shall pass through the folding machine unfolded, the snap switch 89 for the proper lane is moved to open position, which opens the circuit to its corresponding solenoid 90, Fig. 4, so that closing of the switch 86, 87 has no effect thereon. In this case the article conveyed by ribbons 37 moves downwardly on plate 138 without fold until it reaches the conveyer 139, the ribbons of which carry it to the lower delivery table 140, Fig. 2.

The operation of the modification shown in Figs. 22 to 26 is similar to that just described. When the forward edge of the article depresses fingers 75, valve 161 is opened, energizing servomotor 163 which operates the timer initiating mechanism and sets it into operation, advancing its timing arms X, Y as in the main form. When the rear edge of the article releases the fingers 75, servomotor 163 is exhausted through a small port in its wall, not shown, the timer is released, and the double-fold position of its operating arms has been established. When the first finger X is actuated, shaft 113 is oscillated to open valve 166 thus energizing servomotor 164 which operates the first folding mechanism 59 and produces the first fold in the article. Likewise when the second finger Y is operated shaft 115 is turned, opening valve 167 and energizing servomotor 165 to operate the second folding mechanism 60 to produce the second fold in the article.

What I claim is:

1. In combination, a flatwork ironer, flexible endless members for conveying work through the ironer, means for causing travel of said endless members, a folding machine embodying work feeding and folding devices, and means for operating the devices of the folding machine to feed and fold articles passing therethrough, said last named means including a train of mechanism actuated solely by said flexible endless members.

2. In combination, a flatwork ironer, endless apron members for conveying work through the ironer, means for causing travel of said endless members, adjustable brackets supporting the delivery end of said apron members, a folding machine driven by said apron members to fold an article passing through the machine, a measuring device controlling said folding machine to fold an article according to its length, and supports for said measuring device pivoted to the folding machine and movably connected to said brackets, so that said ironer and folding machine may remain a fixed distance apart and said measuring device may move with adjustment of said brackets.

3. In combination, a flatwork ironer, endless apron members for conveying work through the ironer, means for causing travel of said endless members, adjustable brackets supporting the delivery end of said apron members, a folding machine driven by said apron members to fold an article passing through the machine, a measuring device controlling said folding machine to fold an article according to its length, and supports for said measuring device pivoted to the folding machine and movably connected to said brackets, said folding machine including endless belts for conveying the work, the said aprons and endless belts being arranged to both move past the measuring device and to support the work between them, so that said aprons and endless belts and measuring device may remain in operative relation during adjustment of said brackets.

4. In combination, ironing and folding machines for handling relatively long articles such as sheets, said machines being arranged with the discharge end of said ironing machine adjacent the receiving end of said folding machine, feeding means in said folding machine for passing articles therethrough, a folding device in said folding machine for folding articles passing therethrough, endless flexible members for conveying articles through said ironing machine, an article measuring device adjacent said endless members and responsive to an article on said endless members, and means for actuating said folding device responsive to said measuring device, said endless members extending from the ironing machine beyond the measuring device to and at least part way through the folding machine and thereby serving to convey articles in both machines.

OSCAR W. JOHNSON.